United States Patent
Borgen et al.

(10) Patent No.: US 6,321,485 B1
(45) Date of Patent: Nov. 27, 2001

(54) FLUID EXCHANGE SYSTEM AND METHOD

(75) Inventors: Arden L. Borgen, Des Moines; Cleon C. Merrill, Windsor Heights; Damon E. Rockwell, Urbandale, all of IA (US)

(73) Assignee: Margaret Platt Borgen, Des Moines, IA (US)

(*) Notice: Subject to any disclaimer, the term of this patent is extended or adjusted under 35 U.S.C. 154(b) by 0 days.

(21) Appl. No.: 09/808,765

(22) Filed: Mar. 15, 2001

Related U.S. Application Data

(62) Division of application No. 09/352,658, filed on Jul. 6, 1999.

(51) Int. Cl.[7] .................................................. A01G 1/00
(52) U.S. Cl. ................................................... 47/58.1
(58) Field of Search ......................... 47/79, 80, 82, 47/65.5, 66.5, 18.1; 119/72, 74, 259, 224, 225

(56) References Cited

U.S. PATENT DOCUMENTS

| | | | |
|---|---|---|---|
| 3,255,731 | * | 6/1966 | Girard . |
| 4,014,052 | * | 3/1977 | Wolos ........................................ 4/172 |
| 4,103,457 | * | 8/1978 | Carlisle . |
| 4,118,891 | * | 10/1978 | Kehl et al. . |
| 4,148,155 | * | 4/1979 | Allen . |
| 4,161,844 | * | 7/1979 | Hentschel et al. ........................ 47/62 |
| 4,185,414 | * | 1/1980 | Miller . |
| 4,300,311 | * | 11/1981 | Marchant . |
| 4,356,665 | * | 11/1982 | Di Oliveira .............................. 47/80 |
| 4,458,501 | * | 7/1984 | Kooy ...................................... 62/256 |
| 4,805,342 | * | 2/1989 | Jenkins et al. . |
| 4,953,363 | * | 9/1990 | Primozic . |
| 5,366,618 | * | 11/1994 | Foster .................................... 210/138 |
| 5,469,810 | * | 11/1995 | Chaing ............................. 119/225 X |
| 5,553,418 | * | 9/1996 | Mason et al. . |
| 5,585,010 | * | 12/1996 | Dockery et al. ...................... 210/805 |
| 5,644,868 | * | 7/1997 | Lui ........................................... 47/81 |
| 5,785,183 | * | 8/1998 | Rejete ................................... 211/1.51 |
| 5,860,289 | * | 1/1999 | Wetzel .................................... 62/255 |
| 5,866,018 | * | 2/1999 | Hyde et al. ....................... 119/259 X |

FOREIGN PATENT DOCUMENTS

| | | | |
|---|---|---|---|
| 409140525A | * | 6/1997 | (JP) . |
| 10257944A | * | 9/1998 | (JP) . |
| 10262454A | * | 10/1998 | (JP) . |

\* cited by examiner

*Primary Examiner*—Peter M. Poon
*Assistant Examiner*—Kevin Jakel
(74) *Attorney, Agent, or Firm*—Zarley, McKee, Thomte, Voorhees & Sease

(57) ABSTRACT

A fluid exchange system includes at least one container. A feed tube connected to a fluid source is positioned to dispense fluid into the container. A drain tube is connected to the container and is adapted to remove fluid from the container. The container is removable for cleaning.

24 Claims, 12 Drawing Sheets

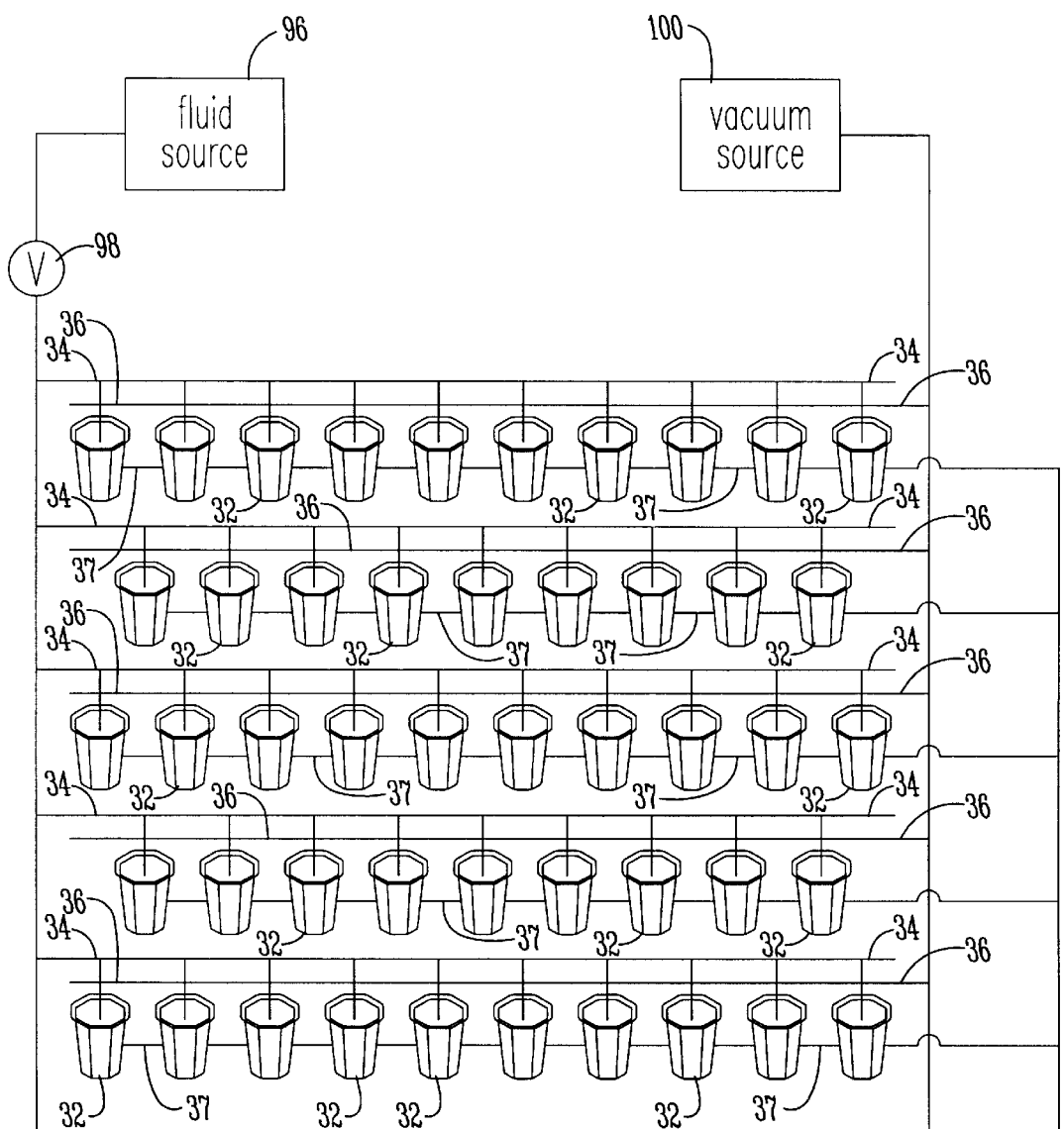
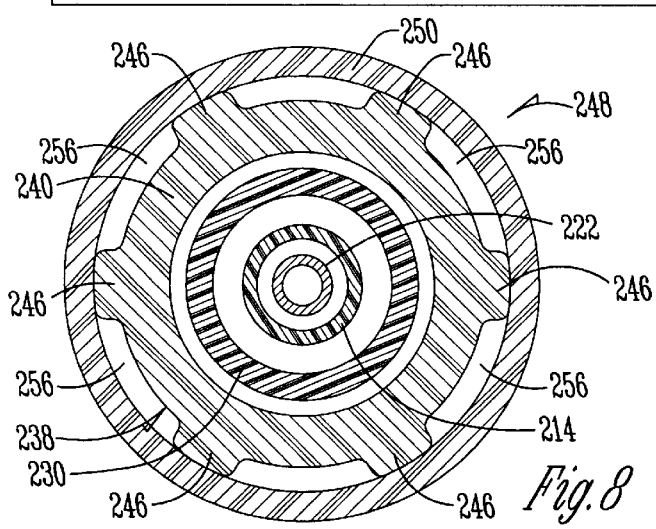
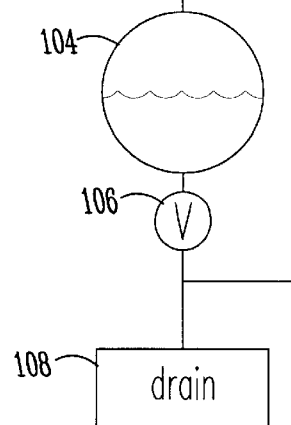
Fig. 8
Fig. 5

FLUID EXCHANGE SYSTEM AND METHOD

CROSS REFERENCE TO A RELATED APPLICATION

This application is a division of Ser. No. 09/352,658 filed Jul. 6, 1999.

BACKGROUND OF THE INVENTION

The present invention relates to a floral fluid exchange system and method.

Floral displays of flowers to be sold are usually arranged in a cooler within a plurality of vases. It is desirable to provide fresh fluid to those vases so as to maintain the flowers in a fresh condition.

Various methods have been provided in the prior art for creating a fluid exchange within a floral display system. One prior art method utilizes water troughs or tubes which extend horizontally across the display system and which are stacked above one another. Each of the tubes include openings for receiving vases which have slots or perforations in their bottom wall. The troughs or tubes are filled with the fluid, and the fluid enters the vases through the slots in the bottoms of the vases. One disadvantage of this prior art method is that the troughs or vases harbor and collect bacteria and debris. This necessitates frequent cleaning of the insides of the troughs or tubes.

Another disadvantage of this prior art method is that large quantities of fluid are required to fill the troughs, thereby necessitating larger quantities of floral preservatives for the system.

Therefore, a primary object of the present invention is the provision of an improved floral fluid exchange system and method.

A further object of the present invention is the provision of a floral fluid exchange system which minimizes the harboring and collection of bacteria and debris.

A further object of the present invention is the provision of an improved floral fluid exchange system which permits the periodic removal of the fluid from the vases so as to minimize the generation of bacteria and debris.

A further object of the present invention is the provision of an improved floral fluid exchange system and method which permits periodic cleaning of the vases individually and which maintains the remainder of the system free from debris.

A further object of the present invention is the provision of an improved floral fluid exchange system which reduces the amount of water and preservative needed per vase from what was required in prior art methods and systems.

A further object of the present invention is the provision of an improved floral fluid exchange system and method which is economical to manufacturer, durable in use, and efficient in operation.

SUMMARY OF THE INVENTION

The foregoing objects may be achieved by a floral fluid exchange system comprising at least one container having a bottom, side walls, and an open top forming a container chamber. A feed tube includes a first end positioned within the container chamber for dispensing fluid into the chamber, and having a second end connected to a fluid source. An evacuation tube has a first end in communication with the vase chamber adjacent the bottom of the vase. A valve is connected to the evacuation tube. The valve is moveable from an open position making the evacuation tube operative to remove substantially all of the fluid from the vase chamber to a closed position making the evacuation tube inoperative to remove fluid from the vase chamber.

In one embodiment of the invention the evacuation tube is a drain tube adapted to drain fluid from the vase chamber by gravity.

In another embodiment of the present invention the evacuation tube is a vacuum tube having a first end in communication with the vase chamber adjacent the bottom and having a second end connected to a vacuum source.

A further modification of the present invention comprises a supply-drain assembly which includes a drain conduit with an inlet opening and a fluid supply conduit with an outlet opening. The vase includes side walls, a bottom wall and an open top, with the bottom wall having an aperture extending therethrough. The vase is mounted in a mounted position relative to the supply drain assembly with the supply drain assembly extending upwardly through the aperture in the bottom wall of the vase so that the inlet opening of the drain conduit and the outlet opening of the fluid supply conduit are in communication with the vase chamber. A seal provides a fluid tight seal between the bottom wall of the vase and the supply drain assembly. The vase can be removed from the supply drain assembly merely by lifting it upwardly so that the supply drain assembly slips out of the aperture in the bottom wall of the vase.

The foregoing fluid exchange system may be used with a single vase or with a plurality of vases mounted in horizontal rows. When the system is used with a plurality of vases, a feed connector connects all of the ends of the feed tubes to the fluid source; an evacuation connector connects all of the second ends of the evacuation tubes to a drain; and a drain connector connects all of the second ends of the over flow tubes to a drain.

The method of the present invention comprises introducing a fluid into the vase chamber through a feed tube having a dispensing end positioned within the vase chamber. The height of the fluid is limited within the vase chamber by an over flow tube having a inlet opening positioned at a predetermined height within the vase chamber. Periodically, the fluid is removed from the vase chamber through an evacuation tube having a first end within the vase chamber adjacent the bottom thereof. The method may comprise using an evacuation tube which is a drain tube for draining fluid by gravity, or the method can comprise using a vacuum tube connected to a vacuum source for drawing the fluid out of the vase chamber.

In yet another embodiment of the present invention a manifold assembly comprises a fill manifold connected to a fluid source and a drain manifold connected to a drain. The manifold assembly includes a manifold opening therein. A vase includes a side wall and a bottom wall forming a vase chamber. A vase opening is formed in the side wall a predetermined distance above the vase bottom wall.

An external ell has a vase end connected to the vase opening and a manifold end fitted within the manifold opening of the manifold assembly. The external ell includes a fill conduit and a drain conduit each having a first end in communication with the vase chamber and a second end exiting through the manifold end thereon.

A drain tube includes an upper end connected to and in communication with the first opening of the drain conduit and having a lower end adjacent the bottom wall of the vase.

The second end of the fill conduit is in communication with the fill conduit and the second end of the drain conduit is in communication with the drain manifold.

BRIEF DESCRIPTION OF THE FIGURES OF THE DRAWINGS

FIG. 5 is a schematic view showing the interconnection of the various tubes.

FIG. 8 is a sectional view taken along line 8—8 of FIG. 7.

DETAILED DESCRIPTION OF THE PREFERRED EMBODIMENT

Figure 1:
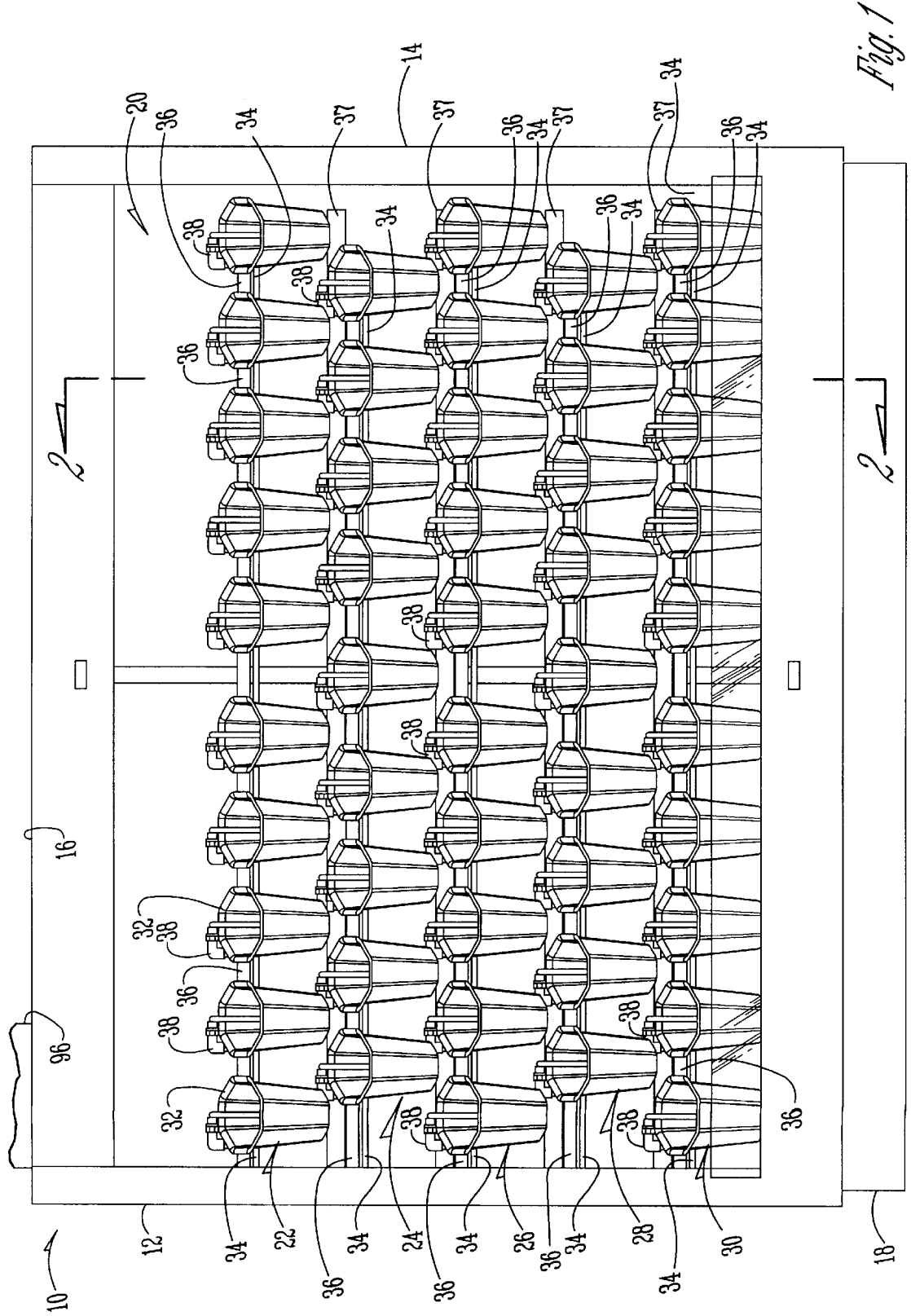
FIG. 1 is a front elevational view of a floral display utilizing the present invention.
Figure 2:
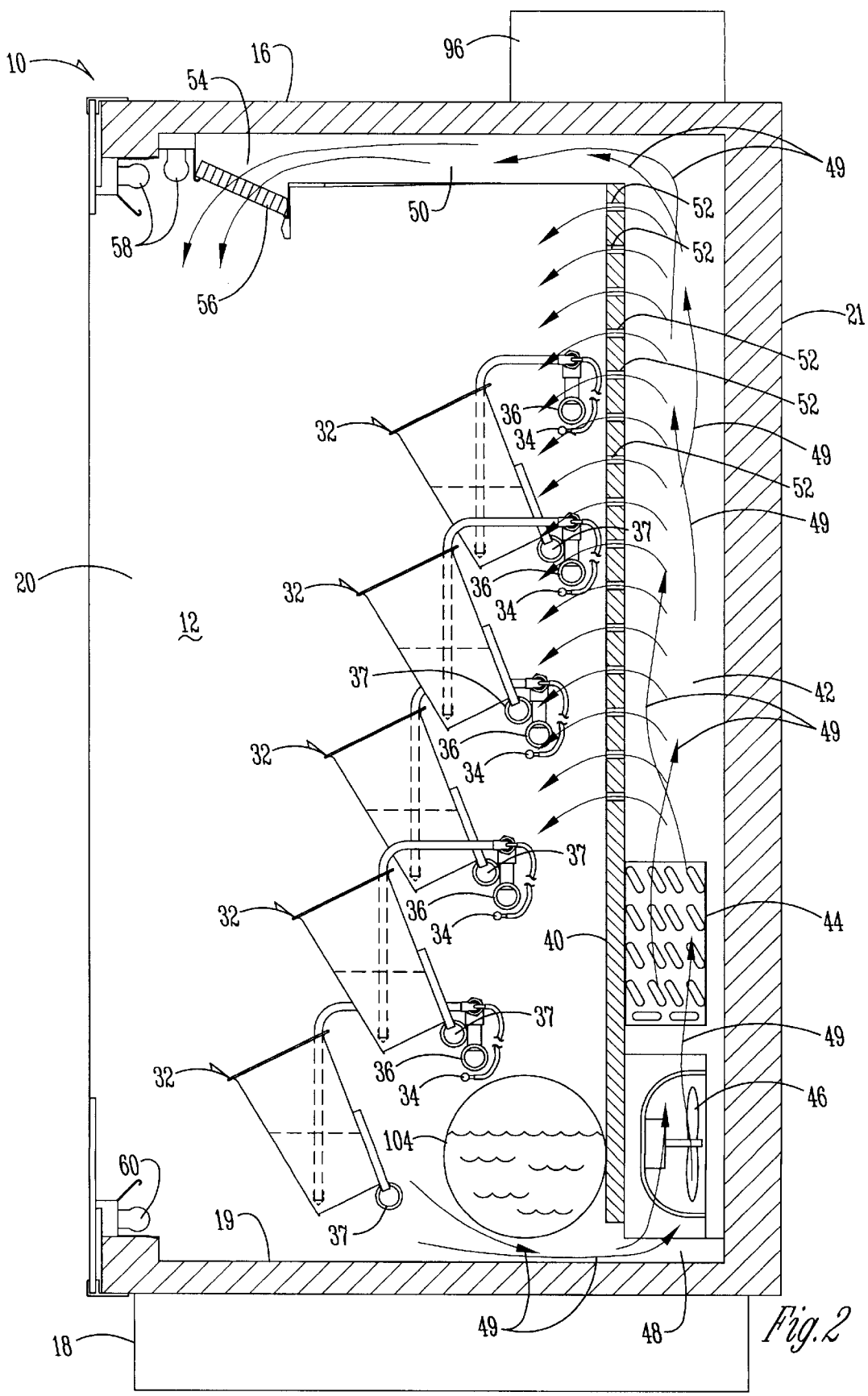
FIG. 2 is a sectional view taken along line 2—2 of FIG. 1.

Referring to FIGS. 1 and 2, the numeral 10 generally designates a display case having end walls 12, 14, a top wall 16, a base frame 18, and a floor 19. A front opening 20 is provided in the display case 10 for permitting access to the contents thereof. Display case also includes a rear wall 21.

Within the display case 10 are several rows 22, 24, 26, 28, and 30 of vases 32. Extending transversely across the display case are a plurality of feed pipes 34, vacuum pipes 36, and drain pipes 37. A plurality of pipe T-assemblies 38 are connected to both the feed pipes 34 and the vacuum pipes 36 as will be explained hereafter in more detail.

Referring to FIG. 2, the display case 10 includes an internal panel 40 which, together with rear wall 21, forms a rear passageway 42. Within the rear passageway 42 are a cooling coil 44, and a fan 46. A bottom inlet 48 permits air to enter passageway 42 and pass upwardly through the fan 46 and the cooling coil 44 in the direction indicated by arrows 49. The cooled air passes upwardly into a top passageway 50. Panel 40 includes a plurality of perforations 52 which permit small amounts of the cooled air to escape into the area where the vases 32 are contained. The largest portion of air, however, passes through an outlet opening 54 at the top of the case 10 through an air grate S6 and drifts downwardly over the vases 32. Case 10 is provided with upper lights 58 and lower lights 60.

Figure 3:
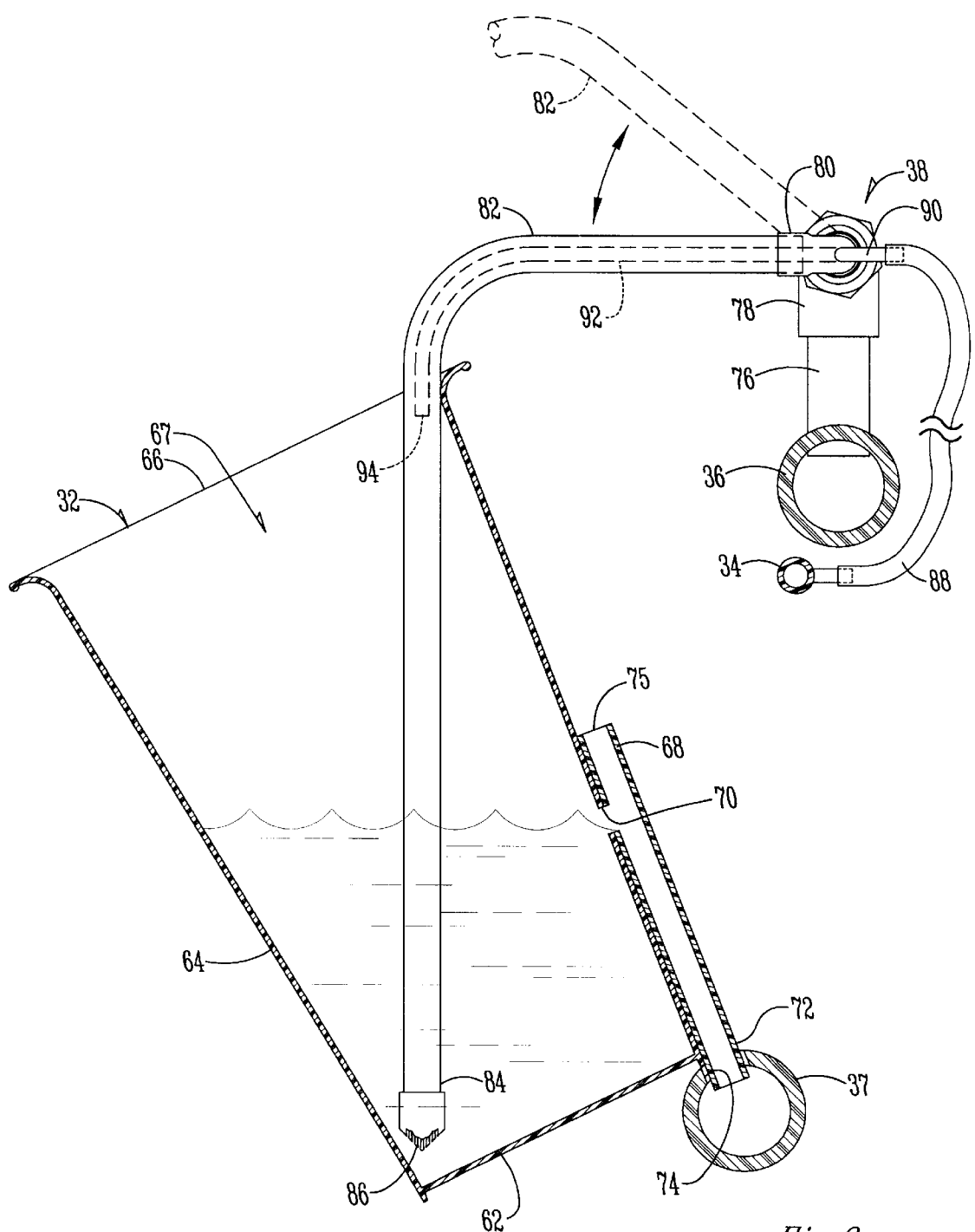
FIG. 3 is an enlarged sectional view showing one of the vases and the various tubes connected to the vase.
Figure 4:
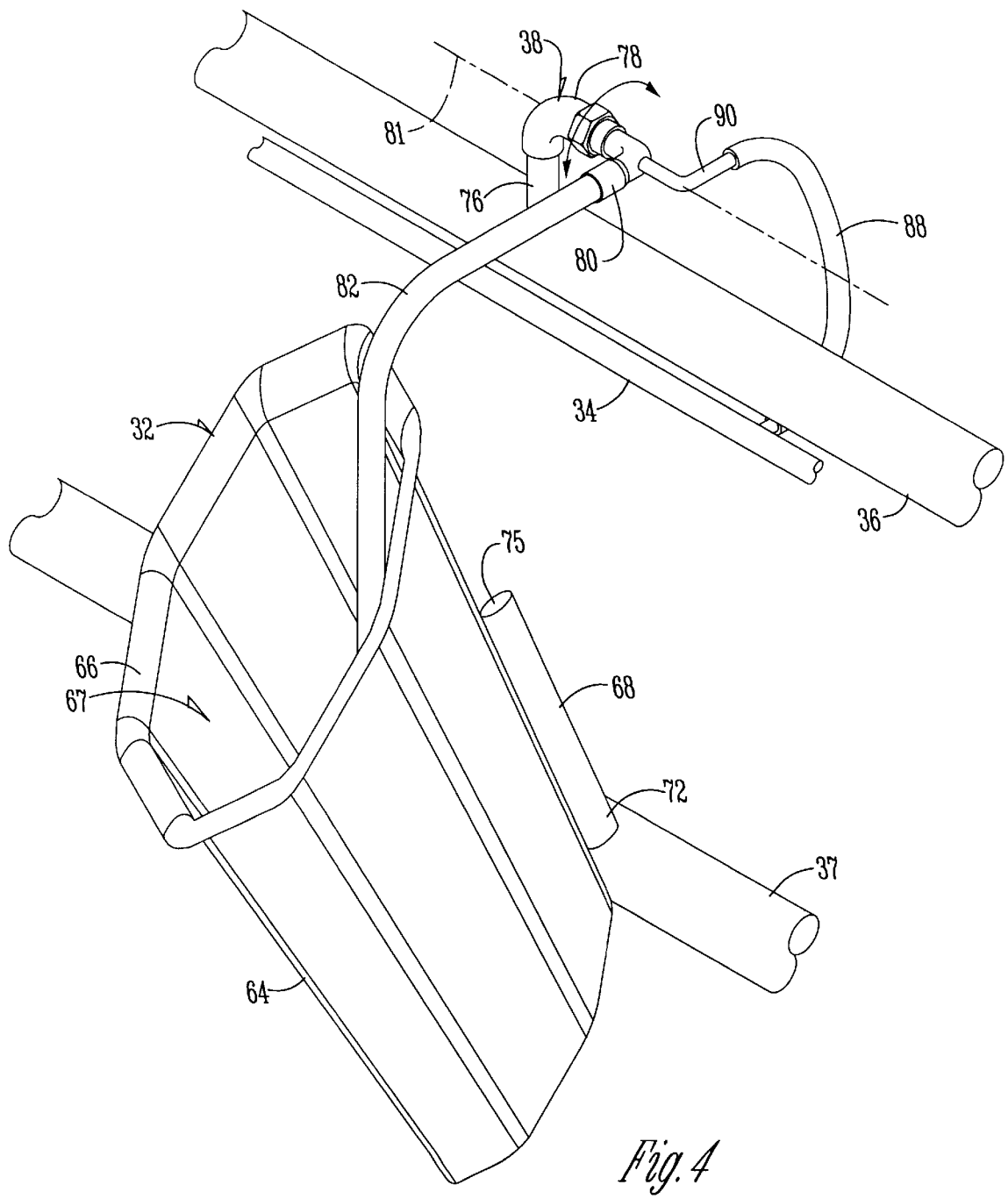
FIG. 4 is a perspective view of one of the vases showing the various tubes connected thereto.

FIGS. 3 and 4 illustrate the details of the vase 32 and the manner in which it is filled. Vase 32 includes a vase bottom 62, vase side walls 64, and a vase open top 66. The interior of the vase 32 provides a cavity or chamber 67. An over flow tube 68 is mounted on the exterior of the vase 32 and is connected to an overflow opening 70 in the side walls 64 of the vase 32. Overflow tube 68 includes a lower end 72 which is fitted within a drain opening 74 in drain tube 37. Overflow tube 68 includes an open upper end 75 which provides venting to permit fluid to drain downwardly through tube 68. Overflow tube 68 may be slipped upwardly out of drain opening 74 so that vase 32 can be individually removable for cleaning.

Pipe-T assembly 38 includes a pipe stem 76 which is in communication with the interior of vacuum pipe 36. Pipe stem 76 includes a right angle bend 78 which is connected to a swivel pipe 80 (FIG. 4) swivel pipe 80 is adapted to pivot about its connection with right angle bend 78 for pivotal movement about an axis 81 parallel to the vacuum pipe 36 and the feed pipe 34.

Connected to swivel 80 is a vacuum tube 82 which extends downwardly within vase 32 to a point adjacent the bottom 62 thereof. The lower end 84 of vacuum tube 82 is provided with a filter 86 which is adapted to filter foreign objects from the fluid as the fluid is drawn upwardly through the vacuum tube 82.

Connected to the feed pipe 34 is a flexible feed connection or hose 88 which in turn is connected to an external feed tube 90. External feed tube 90 extends into swivel 80 and continues as an internal feed tube 92 within vacuum tube 82. The lower end 94 of internal feed tube 92 is also positioned within the vacuum tube 82 and is adapted to direct fluid material downwardly through vacuum tube 92 and through the filter 86. This provides a cleaning action on the filter 86 and helps remove particles which may be blocking filter 86. While feed tube 92 is shown to be inside vacuum tube 89 it is also possible to position feed tube 92 completely outside vacuum tube 82.

FIG. 5 shows a schematic diagram of the manner in which the various components are connected. A fluid source 96 is connected through a valve 98 to the feed pipes 34 and provides a fluid for filling the vases. The fluid may contain fertilizers or other materials which will enhance the lives of the cut flowers and keep them fresh.

A vacuum source 100 is connected to the vacuum pipes 36. A reservoir 104 is provided for receiving the fluid drawn through the vacuum pipes 36. Below reservoir 104 is a drain valve 106 which is connected to a drain 108. As can be seen in FIG. 5, the drain pipes 37 are all connected to drain 108.

In operation, the valve 98 is opened to provide pressurized fluid from the fluid source 96. This causes fluid to be dispensed downwardly through feed tubes 92 into the vases 32. As the level of fluid within the vases reaches the overflow opening 70, the fluid overflows through the opening 70, into overflow pipes 68, into drain pipe 37 and ultimately into drain 108. At this point the valve 98 is closed and the vases 32 are provided with fluid.

It is desirable on occasion to evacuate the fluid within the vases 32 so as to prevent the buildup of bacteria, fungi, and other undesirable materials within the vases 32. This can be accomplished by actuating vacuum source 100. This supplies a vacuum to vacuum tubes 82 and causes the fluid to be drawn upwardly through the filters 86 into the vacuum tubes 82 and the vacuum pipes 36. The fluid then falls downwardly into reservoir 104 and remains there until the drain valve 106 is opened to drain the reservoir 104 into drain 108.

If the filter 86 becomes clogged during the evacuating process, the feed valve 98 can be opened to cause fluid to be directed in the opposite direction through filter 86, and this provides a cleaning action for the filter 86.

If it is desired to remove the vase 32 for cleaning or for replacement, the individual vacuum pipes 82 can be pivoted upwardly about the pivot axis 81 of swivel 80 in the manner shown in FIGS. 3 and 4. This removes the vacuum pipe 82 from the vase 32. Then the vase 32 may be lifted upwardly, with the over flow pipe 68 sliding outwardly from drain pipe 37. After cleaning, the vase can be replaced in its original position and the pipe 82 pivoted down to its original position.

Figure 6:
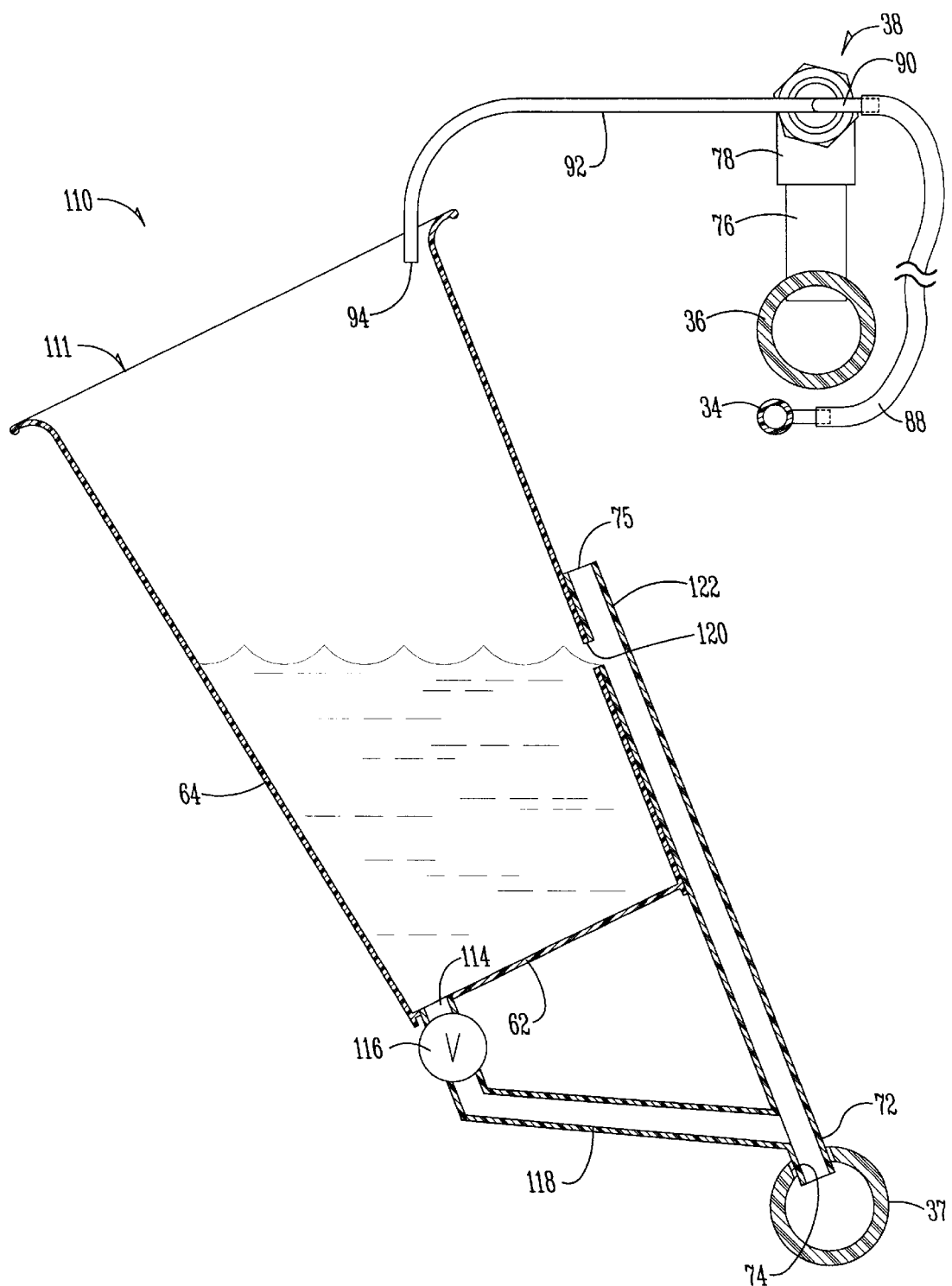
FIG. 6 is a sectional view similar to FIG. 3, but showing a modified form of the present invention.

FIG. 6 illustrates an alternative embodiment 110 of the system shown in FIGS. 1–5. System 110 includes a vase 111 having a drain opening 114 at the lowest part of its bottom wall. Feed tube 92, instead of being contained within a vacuum tube, is directly inserted into the upper end of the vase 111. A drain tube 118 is connected to drain opening 114 and contains a drain valve 116 which may be opened or closed. The drain connection 118 is connected to an overflow tube 122 which in turn dispenses its contents into the drain pipe 37. Overflow tube 122 includes an over flow opening 120 similar to that shown in FIGS. 1–5. Drain pipe 37 may be connected to a vacuum source for removing fluid or it can drain by gravity. Use of a vacuum is preferred.

In the use of the modification shown in FIG. 6, instead of using a vacuum tube to evacuate the vase 111, the drain valve 116 is opened and the fluid is drained by gravity from the vase 111.

Referring to FIGS. 7–10 an alternative embodiment of the present invention is generally designated by the numeral 200. Embodiment 200 includes a vase 202 in combination with a supply-drain assembly 203. Supply-drain assembly 203 includes a double tube extrusion 204, a fluid supply tube 214, and a drain stack 230. Double-tube extrusion 204 includes a fluid supply conduit 206 and a drain conduit 208. The fluid supply conduit 206 is adapted to be connected to a fluid supply and the drain conduit 208 is adapted to be connected to a conventional drain or a collection tank 104. Drain conduit 208 is preferably connected to a vacuum source through collection tank 104.

A fluid supply tube 214 includes a lower end 216 in communication with fluid supply conduit 206 and an open upper end 218 which permits fluid to exit from the fluid supply tube 214. A valve 220 includes a valve stem 222 extending downwardly through the fluid supply tube to a valve seat 224. The upper end of the valve stem includes a valve head 226, and a spring 228 yieldably urges the valve head 226 upwardly so that the valve seat normally is in its closed position seated against the lower end 216 of the fluid supply tube. However, the valve seat 224 can be urged downwardly against spring 228 to its open position shown in FIG. 7 permitting fluid communication from the fluid supply conduit 206 to the fluid supply tube 214.

A drain stack 230 includes an open upper end 231 and a lower end 233 which is in communication with the drain conduit 208.

Figure 7:
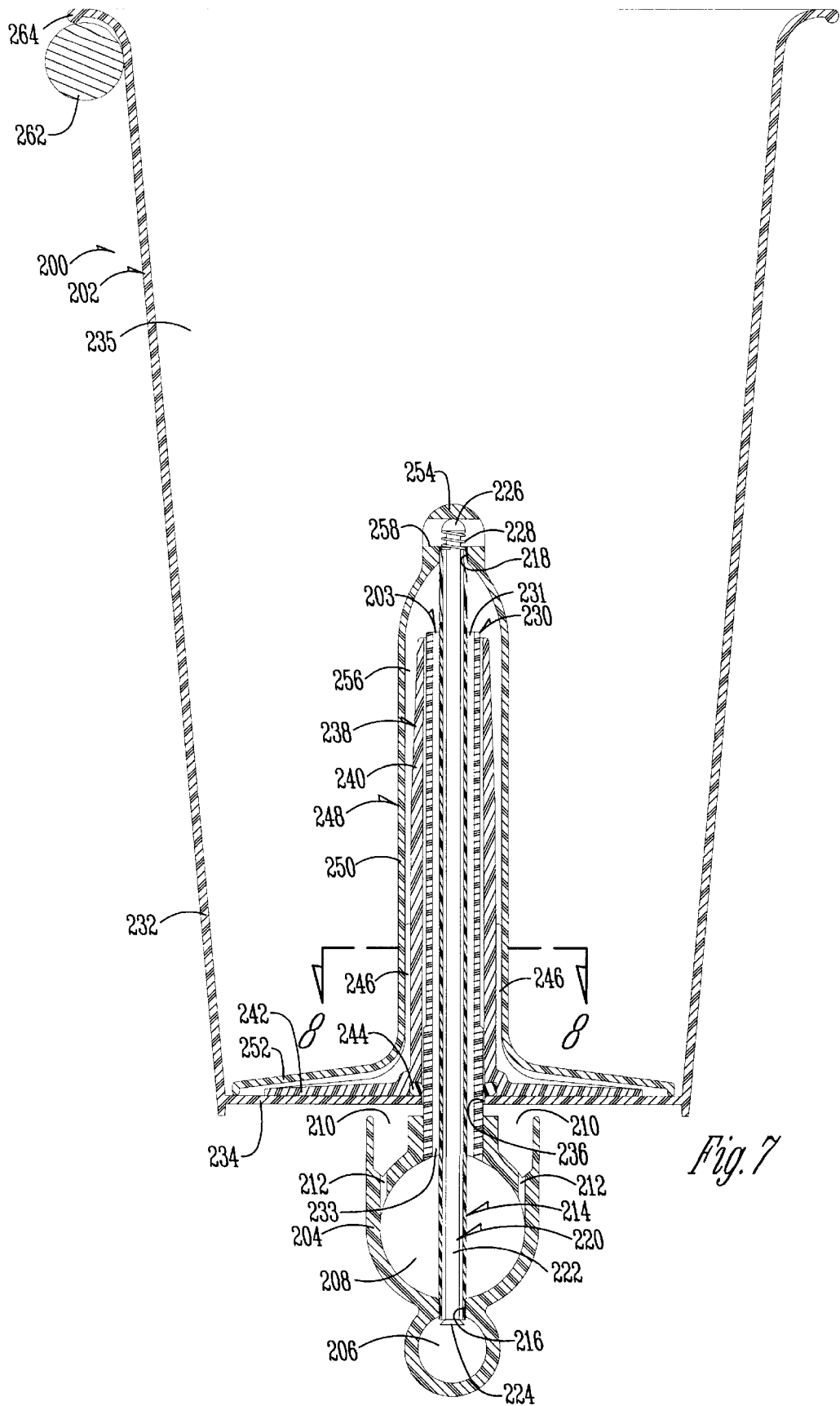
FIG. 7 is a sectional view of another embodiment of the present invention.

Vase 202 includes vase walls 232 and a vase bottom wall 234 which form a vase chamber 235. The bottom wall 234 of the vase 200 includes a central hole or opening 236. The vase 200 is shown in FIG. 7 in a mounted position wherein the central hole 236 is slipped over the drain stack 230 so that the open upper end 231 of the drain stack 230 and the open upper end 218 of the fluid supply tube 214 are in communication with the interior of the vase chamber 235.

Within the fluid chamber 235 is a sealing tube 238 comprising a sealing tube shank 240 and a sealing tube apron 242. The sealing tube shank 240 fits in telescopic fashion over the drain stack 230, and the sealing tube apron 242 flares outwardly from the bottom end of the shank 240 and faces against the bottom wall 234 of the vase 200. An O-ring seal 244 provides a fluid tight seal between the drain stack 230 and the vase 200 as shown in FIG. 7. On the exterior of the shank 240 of sealing tube 238 are a plurality of sealing tube ribs 246 which extend radially outwardly and frictionally engage a cover tube 248 as shown in FIGS. 7 and 8. A cover tube 248 includes a shank 250 and a skirt 252 at its lower end which fits in covering relation over the skirt 242 of the sealing tube 238. At the top of the cover tube 248 is a cover tube head 254 which engages the head 226 of the valve 220. With the vase 200 in the position shown in its mounted position shown in FIG. 7, the cover tube head 254 depresses the valve 220 to its open position so that fluid communication is provided from the fluid conduit 206 upwardly through the fluid supply tube 214 to the open upper end 218 of the fluid supply tube 214. A cover tube cross opening 258 permits fluid to communicate from the open end 218 of fluid supply tube 214 to the interior of the vase chamber 235.

The cover tube 248 at its upper end is spaced from the sealing tube 238 and the drain stack 230 so as to create a cover tube cavity 256 therebetween. This permits fluid within the vase chamber 235 to communication with the open inlet end 231 of the drain stack 230. Fluid is free to pass beneath the cover tube skirt 252 and pass upwardly through the cavity 256 and to enter the inlet opening 231 of the drain stack 230. As can be seen in FIG. 8 the ribs 246 are circumferentially spaced so as to provide cavities 256 which permit fluid to pass upwardly between the cover tube shank 250 and the sealing tube shank 240 into the cover tube cavity 256. The upper end of the cover tube head 254 surrounds the upper end 218 of the fluid supply tube 214. However the fit between these two elements is not airtight so that the cover tube cavity 256 is free to vent and permit the fluid to rise within the cavity 256 to the drain opening 231 of the drain stack 230.

Preferably drain conduit 208 is connected to a vacuum source. The use of a vacuum in drain conduit 208 causes fluid within vase chamber 235 to be drawn upwardly into cover tube cavity 256, then through inlet opening 231 of drain stack 230, and finally into drain conduit 208.

Figure 9:
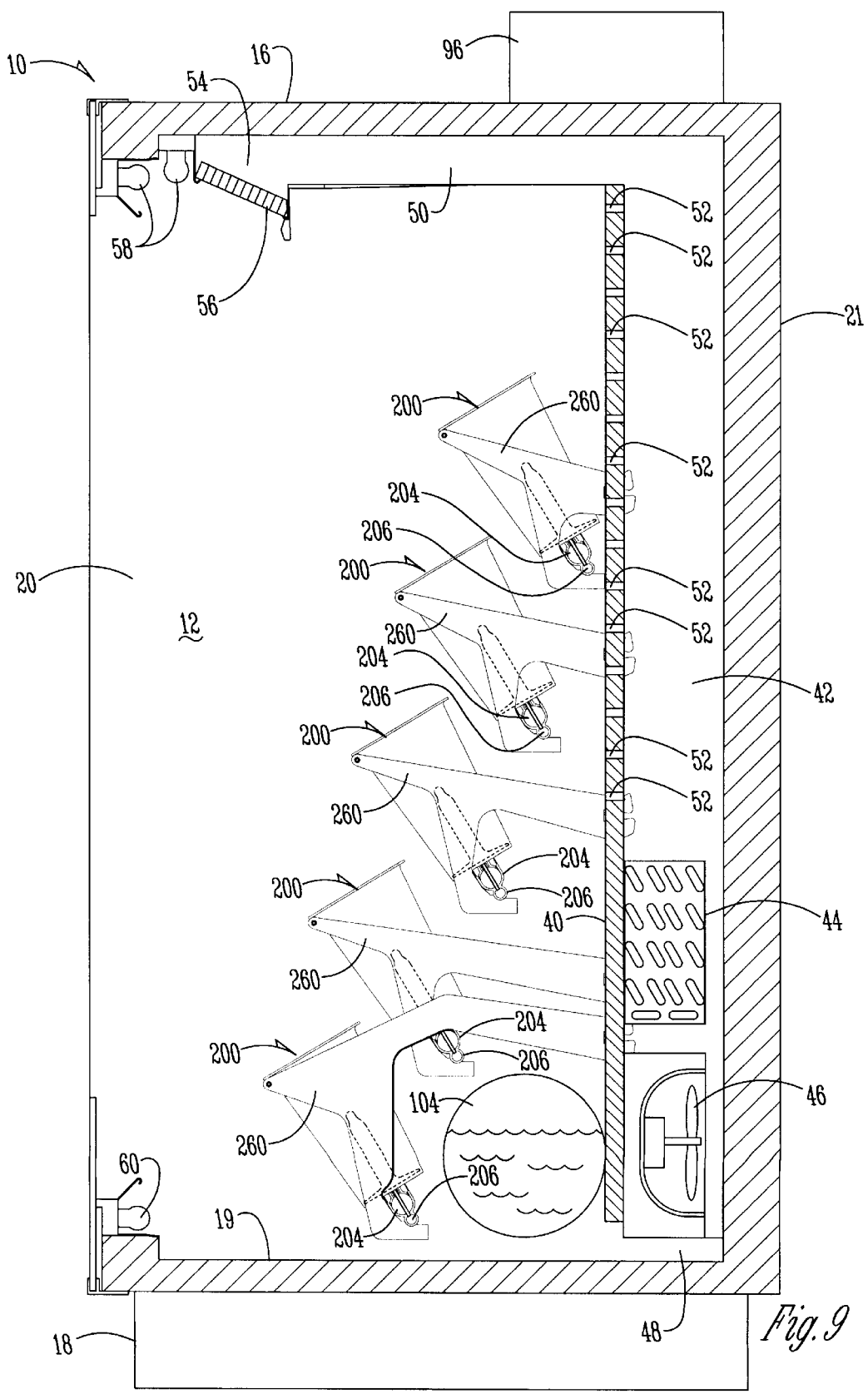
FIG. 9 is a side sectional view of a display case having a plurality of vases such as shown in FIG. 7.

Referring to FIG. 9, the display case 10 is shown with a plurality of the vases 200 positioned therein. Brackets 260 are mounted to the rear wall of the display case 10 and support rods 262 which fit under the lips 264 of each vase 200. The vases 200 can easily be slipped upwardly off of the drain stack 230 for cleaning or servicing. They can then be slipped back on to their mounted position shown in FIG. 9 for use.

In order to fill the vases 200, the fluid supply conduit is connected to a source of pressurized fluid so as to permit the fluid to rise upwardly within the fluid supply tube 214. The fluid exits the upper end 218 of the fluid supply tube 214 and begins filling the vase 200. As the fluid rises within the vase chamber 235, it also causes fluid to rise within the cover tube cavity 256. When the fluid level reaches the inlet opening 231 of the drain stack 230 it begins flowing downwardly into the inlet opening 231. This permits the fluid to drain downwardly through the drain stack 230 into the drain conduit 208. Once all of the vases are filled the pressurized supply of fluid to the fluid conduit 206 can be shut off.

Periodically when it is desired to clean one or more vases 200, they can be slipped off of the drain stack 230. As they are slipped off of the drain stack 230 the spring 228 causes the valve seat 224 to close off the lower end 216 of the fluid supply tube 214.

At the upper end of the double tube extrusion is a catch basin or channel 210 having drain holes 212 providing communication into the drain conduit 208.

The present invention fills and empties the individual vases rather than utilizing elongated troughs or channels which collect fungi and bacteria and are difficult to clean. The present invention also uses less fluid (and chemicals) than prior art systems since only the vases are filled and it is not necessary to fill elongated channels or troughs. In addition to fluid savings, the present system utilizes smaller quantities of floral preservatives while at the same time maintaining the appropriate concentration. Since the vases hold the fluid in this system they can be carried from the cutting area to the case without drawing air into the flower stems. This is a very important item in good floral care practice.

Figure 10:
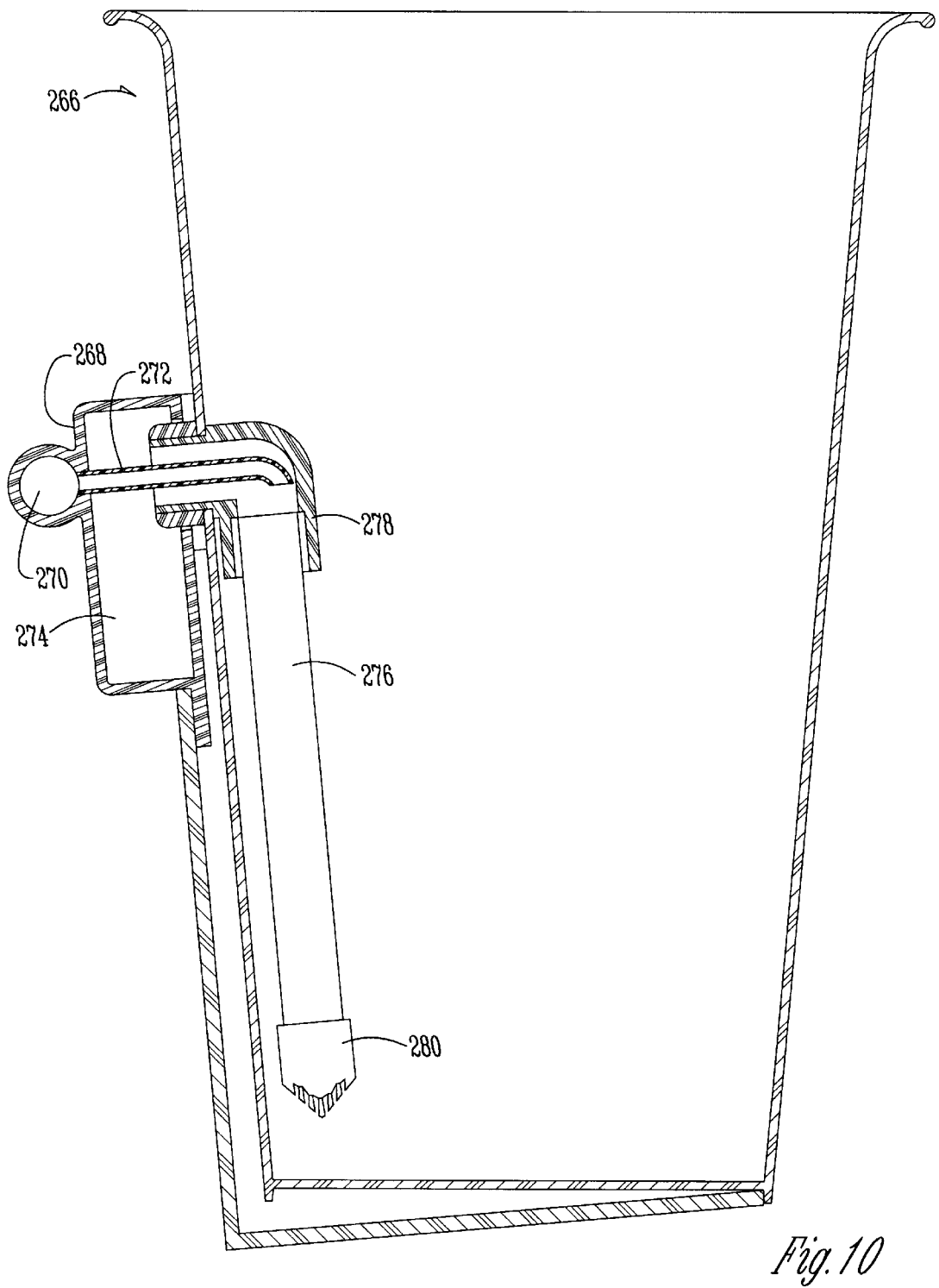
FIG. 10 is a side sectional view of another embodiment of the present invention.

FIG. 10 shows another modified form of the invention. This modified form includes a vase 266 having a supply/drain assembly 268 attached to one of its side walls. The supply/drain assembly 268 includes a supply conduit 270 connected to a source of pressurized fluid. A supply tube extends from the conduit 270 and is adapted to introduce fluid into a drain tube 276 which is also in communication with a drain conduit 274 through an angled coupling 278. A filter 280 is mounted on the bottom end of the drain tube 276.

In operation, fluid is introduced from supply conduit 270 through tube 276 and filter 280 into the vase 266. As the fluid level within the vase reaches the upper end of drain tube 276, it begins overflowing into the drain conduit 274. At that point the introduction of fluid can be stopped or it can be continued to provide continuous recirculation.

Figure 11:
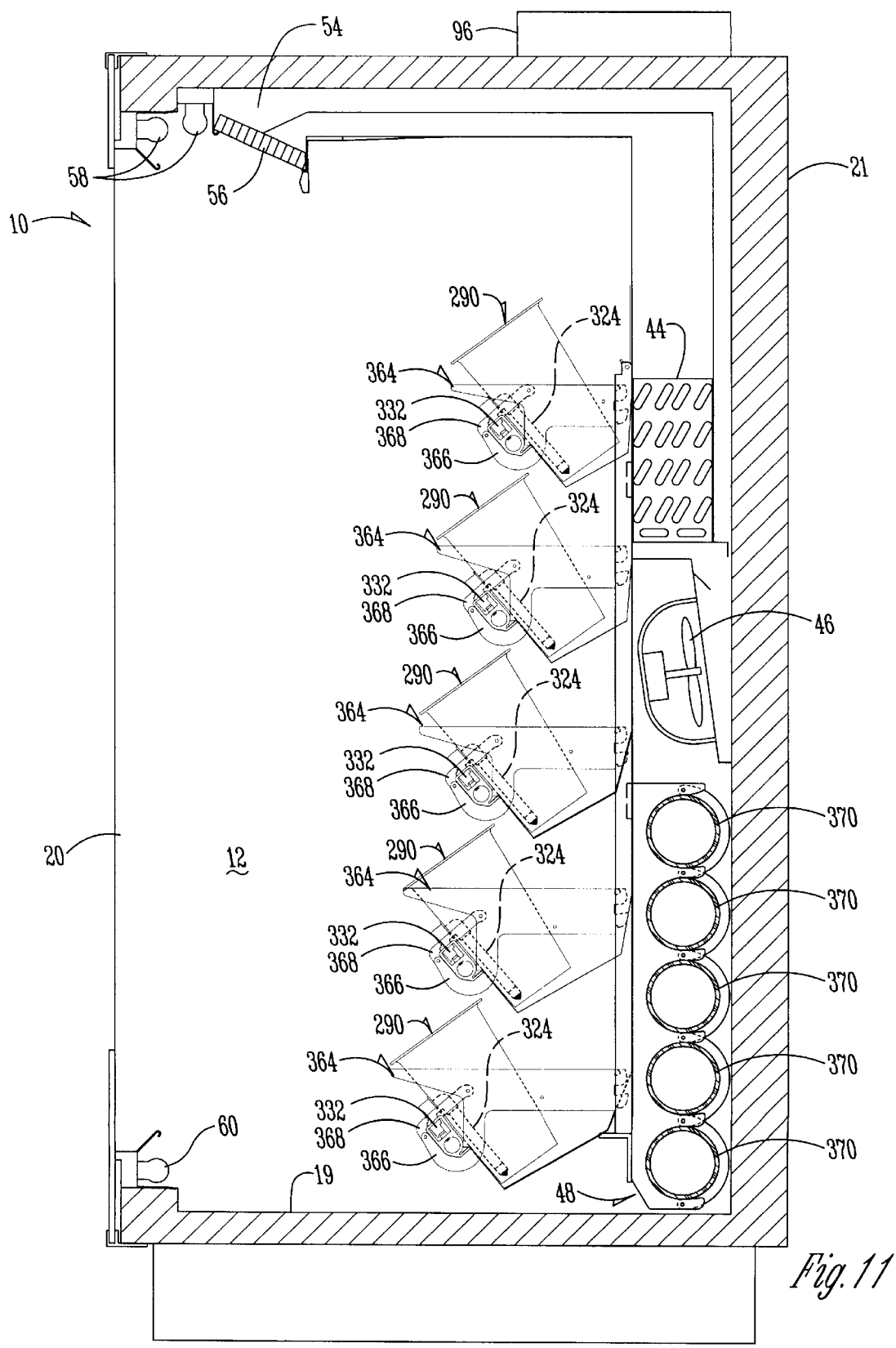
FIG. 11 is a side sectional view of a display case having a plurality of vases incorporating another embodiment of the present invention.
Figure 12:
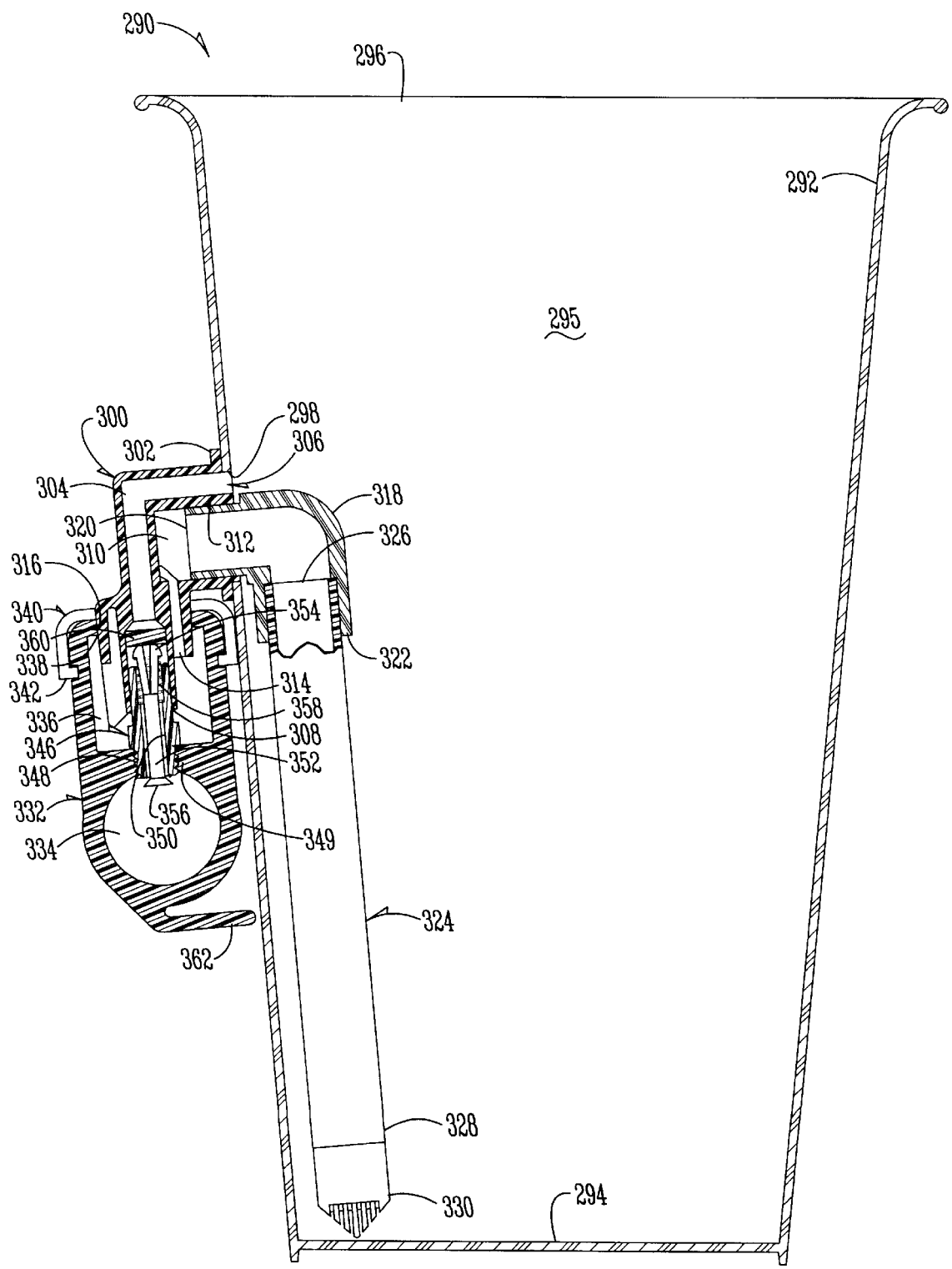
FIG. 12 is a side sectional view of an individual vase such as shown in FIG. 11.
Figure 13:
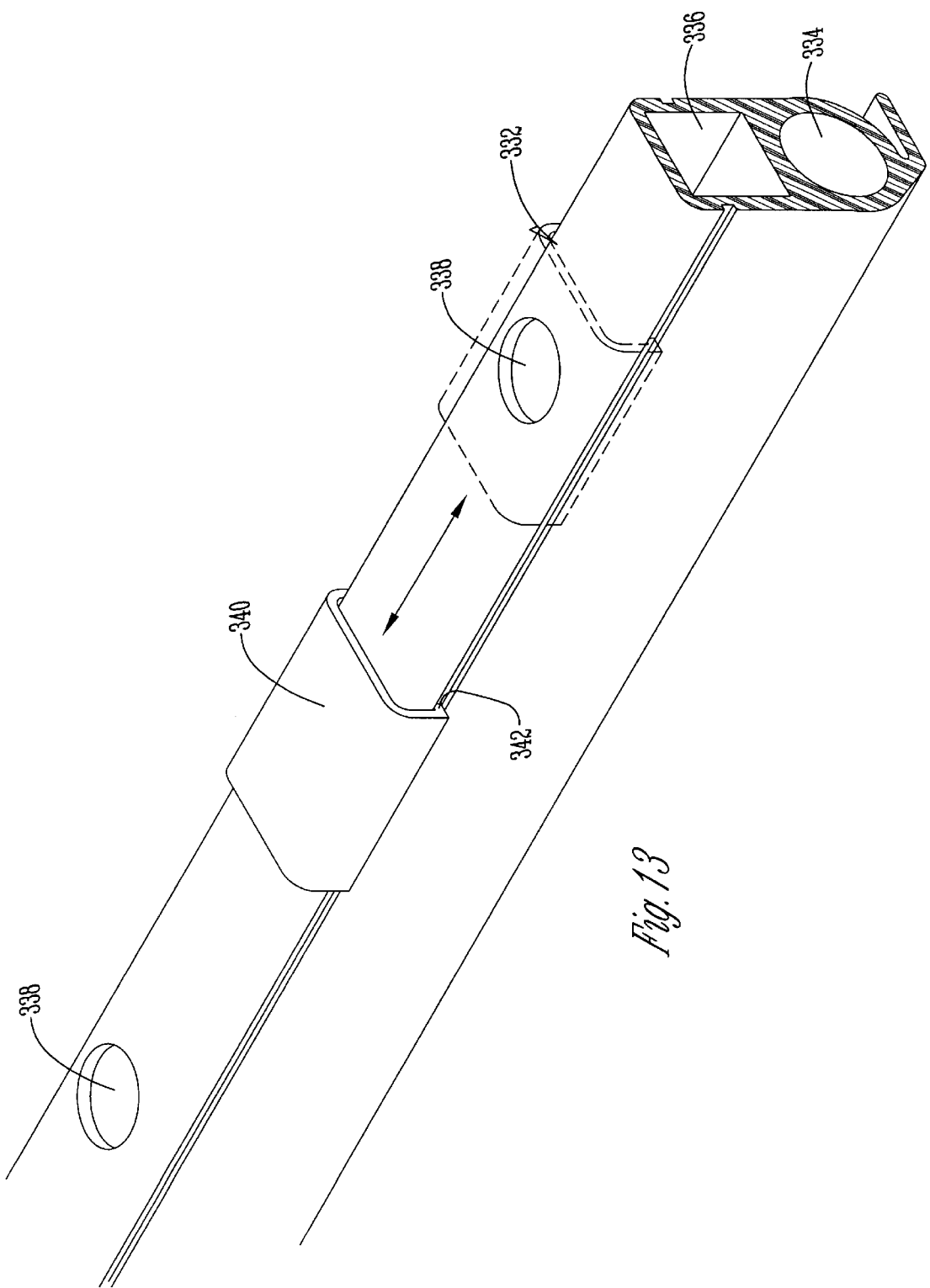
FIG. 13 is a partial perspective view of the manifold assembly of FIGS. 11 and 12.

Referring to FIGS. 11–13 a modified vase embodiment 290 is shown. Each vase 290 includes a side wall 292 and a bottom wall 294 which form a vase chamber 295 having an open upper end 296. Within one of the side walls 292 is a vase opening 298 which is positioned a predetermined distance above the bottom wall 294 of the vase 290.

Fitted within vase opening 298 is an external ell or connector 300. External ell or connector 300 includes a circular attachment flange 302 which is glued or otherwise attached to the side wall 292 of vase 296 around the vase opening 298. External ell or connector 300 includes a fill conduit 304 having an upper end 306 and a lower end 308. External ell or connector 300 also includes a drain conduit 310 having an upper end 312 and a lower end 314. Adjacent the lower end of external ell or connector 300 is a sealing skirt 316.

Fitted within the upper end 312 of drain conduit 310 is a drain tube connector 318 having a first end press fitted within the upper end 312 of drain conduit 310. Preferably the first end 320 of the drain tube connector is tapered in construction so as to facilitate its press fit within the upper end 312 of drain conduit 310. Drain tube connector 318 includes a second end 322 in which is press fitted a drain tube 324 having an upper end 326 and a lower end 328. A filter 330 is provided over the lower end 328.

The numeral 332 generally designates a manifold assembly having a fill manifold 334 and a drain manifold 336 formed therein. Preferably the manifold assembly 332 is an extruded elongated member, and the fill manifold 334 and drain manifold 336 are elongated and follow the longitudinal axis of the manifold assembly 332. A plurality of manifold openings 338 are provided in the upper end of the manifold assembly 332. A seal clip 340 includes clip flanges 342 which engage corresponding grooves in the manifold assembly 332 for the seal clip 340 to slide from its inoperative position shown in FIG. 13 to its operative position over the top of manifold opening 338. This permits sealing of manifold opening 338 whenever the vase 290 is removed for cleaning.

A valve body 346 includes a threaded lower end 348 which is threaded through a threaded opening in a web 349 which divides the fill manifold 334 from the drain manifold 336. Extending vertically within the valve body 346 is vertical valve bore 350 which is in communication at its lower end with the fill manifold 334.

Extending within the vertical valve bore 350 is a valve stem 352 having an upper end 354 and a lower valve head 356 which is adapted to seat against and close off the lower end of the vertical valve bore 350. A valve spring 358 yieldably urges the valve head 356 into seated engagement with the lower end of the vertical bore 350. However, the valve stem 352 is movable to an open position as shown in FIG. 12 with the valve head 356 unseated from the lower end 350 of the vertical valve bore.

As can be seen in FIG. 12 the sealing skirt 316 of external ell 300 is press fitted within manifold opening 338. A sealing engagement is facilitated by the fact that the sealing skirt 316 is tapered.

When the sealing skirt 316 is mounted within the manifold opening 338 as shown in FIG. 12, the upper end 354 of the valve stem 352 fits within the lower end 308 of the fill conduit 304. A valve actuator 360 is fitted within the fill conduit 304 for engaging the upper end 354 of the valve stem 352 and for yieldably urging it against the spring 358 to its open position shown in FIG. 12. This provides communication from the fill manifold 334 upwardly through the valve bore 350 and then through the fill conduit 304. Introduction of pressurized fluid to the manifold 334 causes fluid to be discharged into the vase chamber 295 through the upper end 306 of fill conduit 304.

As the fluid rises within the vase chamber 295, it also fills the drain tube 324. As the fluid level reaches the level of the upper end 312 of the drain conduit 310 it beings flowing by gravity through the drain conduit 310 and outwardly through the lower end 314 thereof into the drain manifold 336 where the fluid is permitted to drain away. This provides an overflow function so that the fluid within the vase 290 never rises above the upper end 312 of the drain conduit 310.

Once the desired level of the fluid within the vase 290 is achieved, fluid pressure is removed from the manifold 334 and the vase is ready for receiving flowers.

When it is desired to recirculate fluid through the vase 290, a vacuum is applied to the drain manifold 336. This vacuum communicates with the drain tube 324 through the drain conduit 310 and begins to draw fluid into the filter 330 at the lower end 328 of the drain tube 324. The fluid is drawn upwardly through drain tube 324 and ultimately is drawn into the drain manifold 336 where it is drained away.

Simultaneously with the application of the vacuum to the drain manifold 336, the fill manifold 334 can be introduced to fluid pressure so as to begin introducing fresh fluid into the vase 290. This filling action together with the vacuum draining action causes recirculation of the fluid within the vase 290.

When it is desired to clean the vase, the vase is merely lifted upwardly and the sealing skirt 316 is removed from the manifold opening 338. This permits individual cleaning of the vases as desired.

Referring to FIG. 11, the elongated manifold assemblies 332 are held in position by brackets 364 which have hooks 366 that cradle and support the manifold assemblies 332. A locking lever 368 is pivotally mounted to the hook 366 and may be pivoted to lock the manifold assemblies 332 to the brackets 364 as shown in FIG. 11.

A plurality of vacuum drain lines 370 are provided at the lower end of the display case 10. Each of these vacuum drain lines 370 are connected to one of the vacuum manifolds 334 in the manifold assemblies 332. A separate vacuum drain line is connected to each separate manifold assembly 332.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing form the spirit or scope of the invention as further defined in the following claims.

What is claimed is:

1. In combination:
   a supply-drain assembly having a drain conduit with an inlet opening and a fluid supply conduit with an outlet opening;
   a container having side walls, a bottom wall and an open top forming a container chamber therein, the bottom wall having an aperture extending therethrough;
   the container being in a mounted position relative to the supply-drain assembly wherein the supply-drain assembly extends upwardly through the aperture in the bottom wall of the container with the inlet opening of the drain conduit and the outlet opening of the fluid supply conduit being in fluid communication with the container chamber;
   a seal adjacent the aperture in the bottom wall of the container, providing a fluid tight seal between the bottom wall of the container and the supply-drain assembly.

2. A combination according to claim 1 wherein the container is removable from the supply drain assembly.

3. A combination according to claim 2 and further comprising a valve connected to the fluid supply conduit and being movable from a closed position preventing fluid from exiting the outlet opening thereof to an open position permitting fluid to exit the outlet opening.

4. A combination according to claim 3 wherein the container further comprises an actuator engaging the valve and urging the valve to its open position when the container is in its mounted position.

5. A combination according to claim 4 and further comprising a spring yieldably urging the valve to its closed position whenever the container is removed from the supply-drain assembly.

6. A combination according to claim 1 a cover tube is within the container chamber surrounding the drain inlet opening and the fluid supply outlet opening of the supply-drain assembly when the container is in its mounted position, the cover tube permitting fluid within the container chamber to communicate with the fluid supply outlet opening and the drain inlet opening.

7. A combination according to claim 6 and wherein the cover tube includes a flared skirt portion adjacent the bottom wall of the container.

8. A method for circulating fluid to a plurality of floral containers, each of said floral containers including side walls, a bottom, and an open top forming a container chamber, said method comprising:
   connecting an elongated drain conduit to a drain, said drain conduit having a plurality of drain holes spaced apart from one another along the length of said drain conduit, each of said drain holes providing communication from outside said drain conduit to the interior of said drain conduit;
   connecting an elongated fill conduit to a source of fluid separate from said drain, said elongated fill conduit having a plurality of fill tubes connected along the length thereof, said fill tubes each having a first end in fluid communication with said fluid within said fill conduit and a second end for dispensing said fluid;
   detachably connecting said plurality of floral containers to said drain conduit with each of said floral containers being positioned adjacent one of said drain holes;
   taking a plurality of drain tubes, each having a drain intake end a drain outlet end;
   placing said intake end of each one of said drain tubes in communication with one of said container chambers and said outlet end of each one of said drain tubes in communication to one of said drain holes for removing fluid from within said container chamber to said drain conduit;
   placing each of said second ends of said fill tubes in communication with one of said floral containers;
   introducing fluid through said fill conduit to each of said fill tubes and into said container chambers;
   draining fluid from said container chambers through said drain tubes and said drain conduit into said drain;
   detaching said floral containers individually from said drain conduit and from fluid communication with said feed tubes.

9. A method according to claim 8 wherein said drain tubes are each attached to one of said containers and said step of detachably connecting each of said containers to said drain conduit comprises inserting each of said outlet ends of said drain tubes into one of said drain holes of said drain conduit.

10. A method according to claim 9 wherein said step of detaching said floral containers from said drain conduit comprises removing said outlet ends of said drain tubes from said holes of said drain conduit.

11. A method according to claim 8 wherein said step of detachably connecting said floral containers to said drain holes comprises taking a plurality of drain connectors having first and second ends, inserting said first end of each of said drain connectors within one of said drain holes and connecting a second end of each of said connectors to said outlet end of one of said drain tubes.

12. A method according to claim 8 wherein said step of detachably connecting said floral containers to said drain holes comprises talking a plurality of ells, each having a first end and a second end, inserting said first end of each of said ells into one of said drain holes, and connecting said second end of each of said ells to one of said drain tubes.

13. A method according to claim 8 and further comprising attaching each of said drain tubes to said drain conduit and said step of detaching each of said containers from said drain conduit further comprises removing each one of said containers individually from said one of said drain tubes that is in communication with said one container.

14. A method according to claim 13 and further comprising removing each one of said containers upwardly from said one of said drain tubes.

15. A method according to claim 14 wherein said step of placing each of intake ends of said drain tubes into communication with one of said container chambers comprises inserting said intake end of each of said drain tubes into an opening in said bottom of one of said containers.

16. A method according to claim 8 wherein said draining step comprises placing a vacuum in communication with said drain tubes for causing said drain tubes to evacuate said fluid from said containers.

17. A method according to claim 16 wherein said step of placing a vacuum in communication with said drain tubes comprises placing said drain conduit into communication with a vacuum.

18. A method according to claim 8 wherein said step of detaching said floral containers individually comprises moving said floral containers upwardly away from said drain conduit.

19. A method according to claim 8 wherein said step of detaching said floral containers individually comprises moving said floral containers horizontally away from said drain conduit.

20. A fluid exchange system comprising:

a plurality of containers, each having side walls, a bottom, and an open top forming a container chamber;

a drain;

an elongated drain conduit connected to said drain and having a plurality of drain holes spaced apart from one another along the length of said drain conduit, each of said drain holes providing communication from outside said drain conduit to the interior of said drain conduit;

a plurality of floral containers detachably connected to said drain conduit, each of said containers being positioned adjacent one of said drain holes and being upwardly or horizontally separable from said drain conduit;

a plurality of drain tubes, each having a drain intake end in communication with one of said container chambers and a drain outlet end in communication with one of said drain holes;

a fluid source;

an elongated fill conduit connected to said fluid source and having a plurality of fill tubes connected along the length thereof, each of said fill tubes having a first end in fluid communication with said fluid within said fill conduit and a second end for dispensing said fluid;

said second ends of said fill tubes each being in fluid communication with one of said container chambers for delivering fluid from said fluid source through said fluid conduit to said one of said container chambers.

21. A fluid exchange system according to claim 20 wherein a vacuum source is selectively connectable to said drain conduit for removing said fluid from said container chamber through said drain tube.

22. A fluid exchange system according to claim 20 wherein said drain tubes are adapted to remove said fluid from said container chambers by gravity.

23. A fluid exchange system according to claim 22 and further comprising a valve within each of said drain tubes, said valve being movable from a closed position preventing removal of said fluid from said container chamber to an open position permitting removal of said fluid from said container chamber.

24. A fluid exchange system according to claim 20 wherein each of said containers is individually upwardly separable from said one of said drain tubes in communication with said container chamber therein.

\* \* \* \* \*